United States Patent [19]
Yonemoto et al.

[11] Patent Number: 4,558,312
[45] Date of Patent: Dec. 10, 1985

[54] POSITION DETECTING DEVICE

[75] Inventors: Hiroshi Yonemoto, Saitama; Akihisa Narimatsu, Tokyo; Nobuyuki Suzuki, Kanagawa, all of Japan

[73] Assignee: Sony Magnescale Incorporated, Tokyo, Japan

[21] Appl. No.: 471,680

[22] Filed: Mar. 3, 1983

[30] Foreign Application Priority Data

Mar. 5, 1982 [JP] Japan ................................ 57-35504
Mar. 5, 1982 [JP] Japan ................................ 57-35505
Mar. 5, 1982 [JP] Japan ................................ 57-35506
Nov. 18, 1982 [JP] Japan ............................... 57-203476

[51] Int. Cl.$^4$ ............................................. G08B 21/00
[52] U.S. Cl. ...................................... 340/680; 29/406; 29/407; 33/552; 340/686; 340/678; 408/16; 409/210
[58] Field of Search ................... 340/680, 686, 678; 33/174 L, 185 R; 29/406, 407; 409/214, 210; 408/13, 16

[56] References Cited

U.S. PATENT DOCUMENTS

| 3,766,653 | 10/1973 | McKay, Sr. | 33/174 L |
| 4,138,823 | 2/1979 | McMurtry | 33/174 L |
| 4,153,998 | 5/1979 | McMurtry | 33/174 L |
| 4,155,171 | 5/1979 | McMurtry | 33/174 L |
| 4,270,275 | 6/1981 | McMurtry | 33/174 L |
| 4,360,973 | 11/1982 | McMurtry | 33/174 L |
| 4,414,750 | 11/1983 | De Fazio | 33/185 R |
| 4,425,061 | 1/1984 | Kindl et al. | 340/680 |

FOREIGN PATENT DOCUMENTS 1445977 8/1976 United Kingdom .
1593682 7/1981 United Kingdom .
1593050 7/1981 United Kingdom .

Primary Examiner—Glen R. Swann, III
Attorney, Agent, or Firm—Lewis H. Eslinger; Alvin Sinderbrand

[57] ABSTRACT

An apparatus for use in determining the location of a surface of a solid object such as that being machined by a machine tool includes a stylus having an electrically conductive end that is supported by two support members, which are disposed in pressure contact with each other by means of a spring or other bias, one of the two support members being formed to have a spherical contact surface that is a portion of an imaginary sphere concentric with the contact electrode, the other of the two support members being formed so that upon contacting the spherical surface the area of contact is substantially line contact. Either alternatively or in addition to the detection of a electrically conductive surface with the contact electrode, the support members may be provided with electrically conductive surfaces so that upon the contact of the electrode contact with a workpiece the electrically conductive surfaces are moved out of electrical contact, thereby providing an additional indication of the position of the surface to be determined.

40 Claims, 32 Drawing Figures

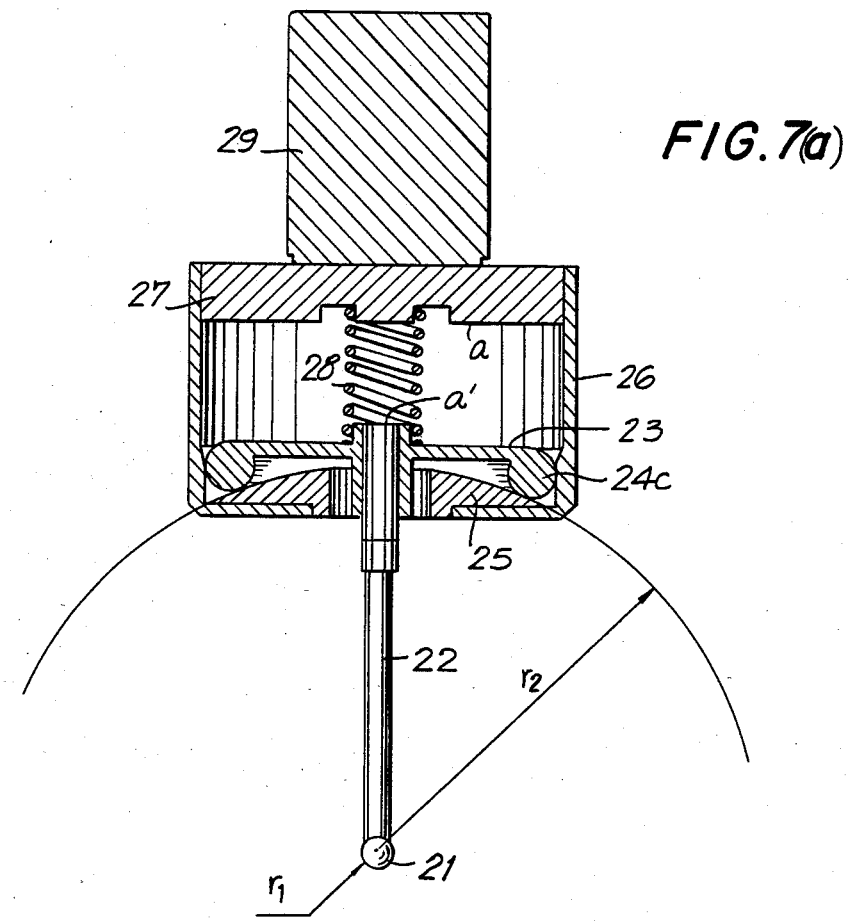
FIG. 7(a)
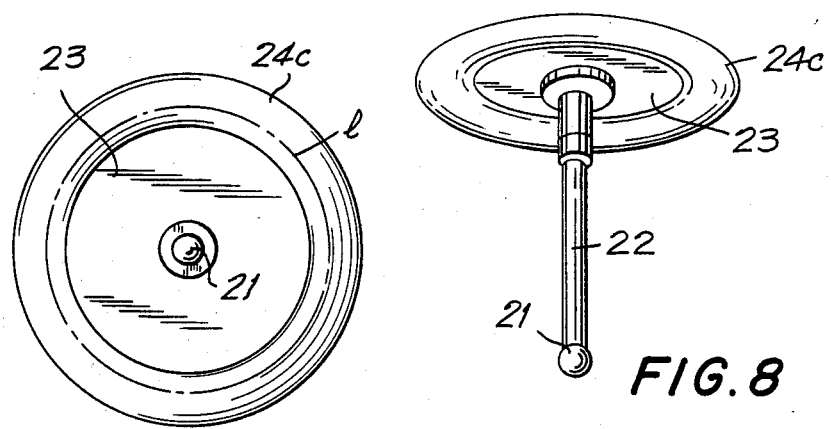
FIG. 7(b)
FIG. 8

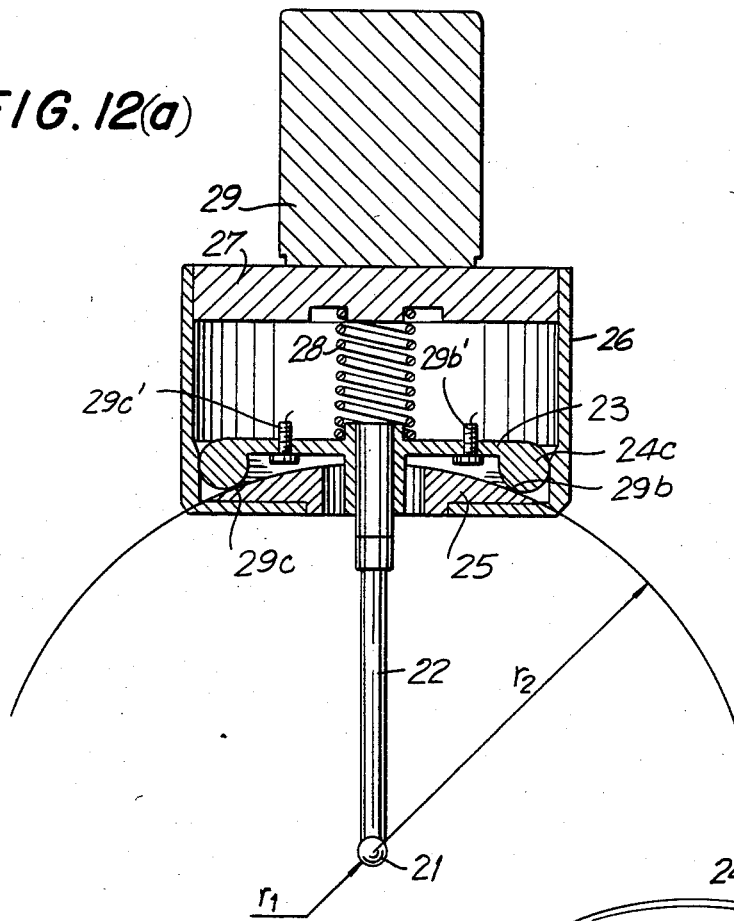
FIG. 12(a)
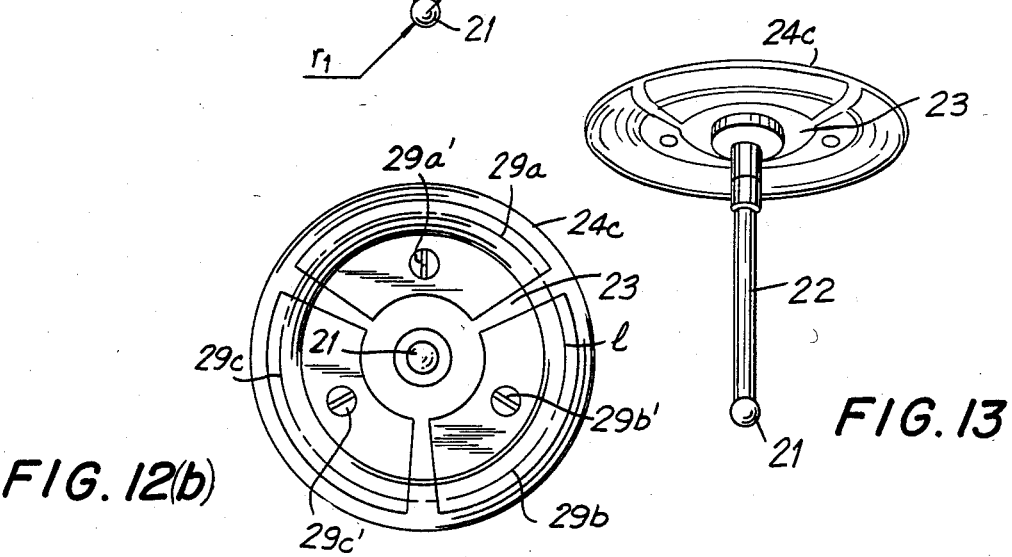
FIG. 12(b)
FIG. 13

POSITION DETECTING DEVICE

BACKGROUND OF THE INVENTION

1. Field of the Invention

The present invention relates in general to a three-dimensional detecting device and, more specifically, relates to an improved position detecting device having a stylus with an electrode contact at one end and an improved means for supporting the stylus.

2. Description of the Prior Art

In the use of numerically controlled (NC) machine tools, such as milling machines, grinders, drill presses and lathes, it is more and more desirable and, in fact, necessary to effect quickly and accurately three-dimensional measurements of the workpieces while in place on the machine tool, both before and after performing the specified work operation. To accomplish this, there are presently known position detecting devices that effect detection of surface positions in relation to the workpiece, as well as to actual working positions of the tool with respect to a location surface on the workpiece. An example of a known prior art detecting device is shown in FIGS. 1(a) and (b) and 2(a) and (b).

Referring then to FIGS. 1(a) and (b) and 2(a) and (b), electrode contact 11 formed as a conductive sphere is mounted at one end of elongate feeler or stylus 12. The structure for supporting stylus 12 includes housing 1, wherein the movable elements of the detecting device are contained. Specifically, three balls 2 are mounted on three thrust screws 3 having cupped ends that are arranged through the bottom of housing 1. These three thrust screws are equally spaced around a suitable diameter bolt circle. Affixed to the end of stylus 12 located inside housing 1 is a disc 4 to which is attached ring or plate 5 formed of insulating material. Attached to insulating plate 5 are receivers 6, 7, and 8, which interact with the three balls 2 mounted on supporting bolts 3. Contact is maintained between receivers 6, 7, and 8 and the respective ball 2 by means of compression spring 10, which at one end abuts the inside of the upper element of housing 1 and at the other end abuts retaining ring 9 formed of insulating material and affixed at the center of disc 4. The extent to which balls 2 are thrust into engagement with the receivers is adjustable by turning threaded screws 3. Once the proper adjustment has been reached the position of each screw 3, in relation to housing 1, is locked by means of three locking set screws 14. The position detecting device shown in FIGS. 1(a) and (b) and 2(a) and (b) is held in a position to make position detecting measurements by means of circular shank 13, which may be held in a chuck or other tool holding device of the numerically controlled machine tool.

Operation of the position detecting device of FIGS. 1(a) and (b) and 2(a) and (b), is represented schematically in FIG. 3, wherein the shank 13 is secured in the appropriate machine tool 17, and electrode contact 11 of stylus 12 is brought into physical contact with an electrically conductive workpiece 18 that is supported by work table 15. The contact position of the stylus 12 and electrode contact sphere 11 is sensed electrically by detection circuit 16 to provide the indication of the relative location of the particular surface of workpiece 18.

In the known device, as shown in FIGS. 1(a) and (b), 2(a) and (b), and 3, receivers 6, 7, and 8 that interact with balls 2 are physically constructed to be different from one another so that each one will have only a single, three-dimensional stable position. For example, receiver 6 has an internally conical surface to receive ball 2, receiver 7 has a V-shaped groove formed therein to receive ball 2, and receiver 8 has a planar surface against which ball 2 abuts.

The known construction as described above suffers numerous drawbacks, not the least of which is the difficulty encountered when aligning or calibrating the three different kinds of receivers, in order to produce a meaningful output signal and also of the numerous parts that are involved in manufacturing and assembling this previously proposed position detecting device.

OBJECTS AND SUMMARY OF THE INVENTION

Accordingly, it is an object of the present invention to provide a device for detecting three-dimensional positions or locations, which has a simple construction utilizing a reduced number of elements compared to known devices.

It is another object of the present invention to provide a three-dimension position detecting device in which the amount of movement of the measurements stylus is always constant regardless of the horizontal operating direction.

It is a still further object of the present invention to provide a three-dimension position detecting device, which can detect positions of a workpiece made of electrically nonconductive, insulating material.

It is another object of the present invention to provide a dimensional position measurement device for use with workpieces having irregular surfaces, grooves, or holes.

It is yet another object of the present invention to provide a device for providing accurate position detection of a workpiece, even when cutting fluid is used during working of the workpiece to be measured.

In achieving these and other objects one aspect of the present invention provides a position detecting device that employs an electrode contact comprising an electrically conductive sphere arranged at the end of a stylus that is supported by two support members disposed in pressure contact with each other and arranged within a housing. One of the support members arranged within the housing is formed as a spherical surface that is a portion of an imaginary sphere concentrically arranged with the electrically conductive sphere at the end of the stylus. The invention teaches that the two support members should be arranged so that there is only line contact between the surfaces of the support members. One of the support members may include a specially arranged conductive layer, and in which case the other support member is formed of an insulative material. The electrode contact tip on the stylus may take various configurations, as dictated by the specific shape of the workpieces, for example, a needle point, or a disc with a spherical edge.

The present invention in another aspect provides logical circuitry for use in obtaining the position detection signal for example, OR gates may be arranged between the outputs of an interior contact switch and an exterior contact switch, in order to produce the position detecting signal.

The above, and other objects, features, and advantages of the present invention, will be apparent from the following detailed description of an illustrative embodiment that is to be read in conjunction with the accompanying drawings, in which the same reference numerals identify the corresponding elements and parts in the several views.

BRIEF DESCRIPTION OF THE DRAWINGS

FIGS. 7(a) and 7(b) are a side elevation in cross section and a bottom plan view, respectively, of an embodiment of the present invention;

FIG. 8 is a perspective view of a portion of the embodiment of FIG. 7(a);

FIGS. 12(a) and 12(b) are a side elevation in cross section and a bottom plan view, respectively, of an embodiment of the present invention;

FIG. 13 is a perspective view of the measuring element of the embodiment of FIG. 12(a);

DETAILED DESCRIPTION OF THE PREFERRED EMBODIMENTS

Figure 1A:
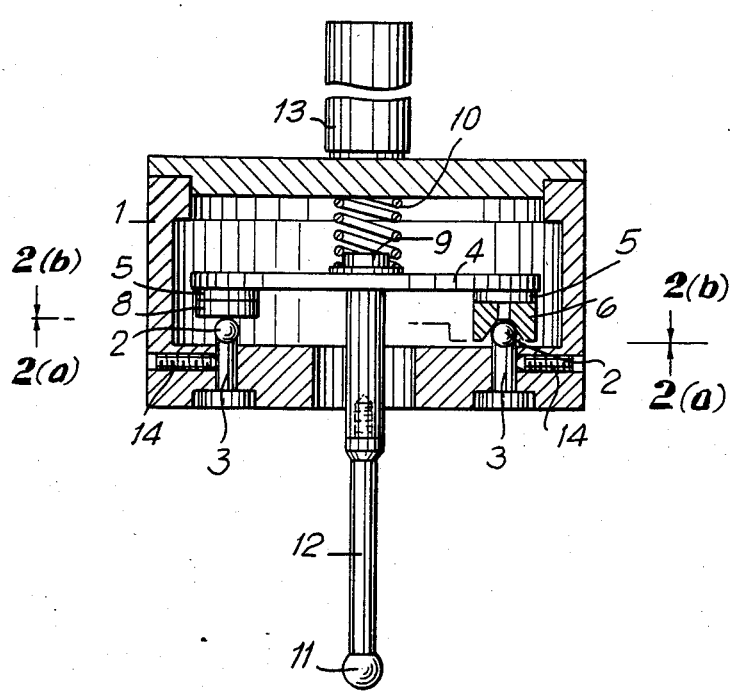
FIGS. 1(a) and 1(b) are a side elevation in cross section and a bottom plan view, respectively, of a prior art position detecting device.
Figure 1B:
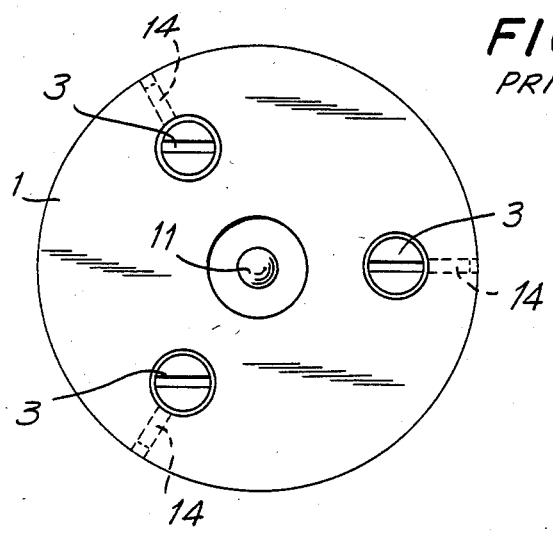
Figure 2A:
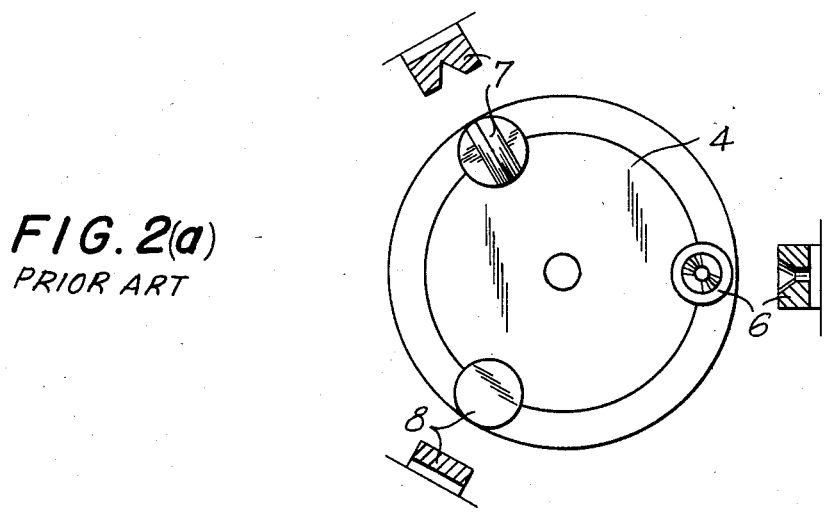
FIGS. 2(a) and 2(b) are cross-sectional plan views as taken through cross-section lines 2(a) and 2(b) in FIG. 1(a), respectively.
Figure 2B:
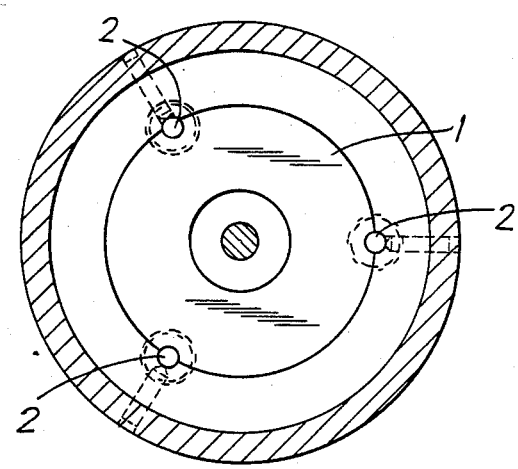
Figure 3:
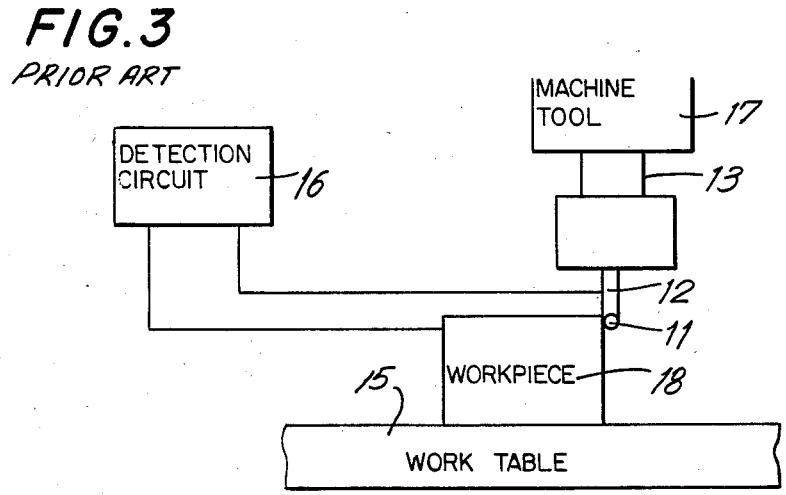
FIG. 3 is a schematic representation of an operational prior art position detecting device.
Figure 4A:
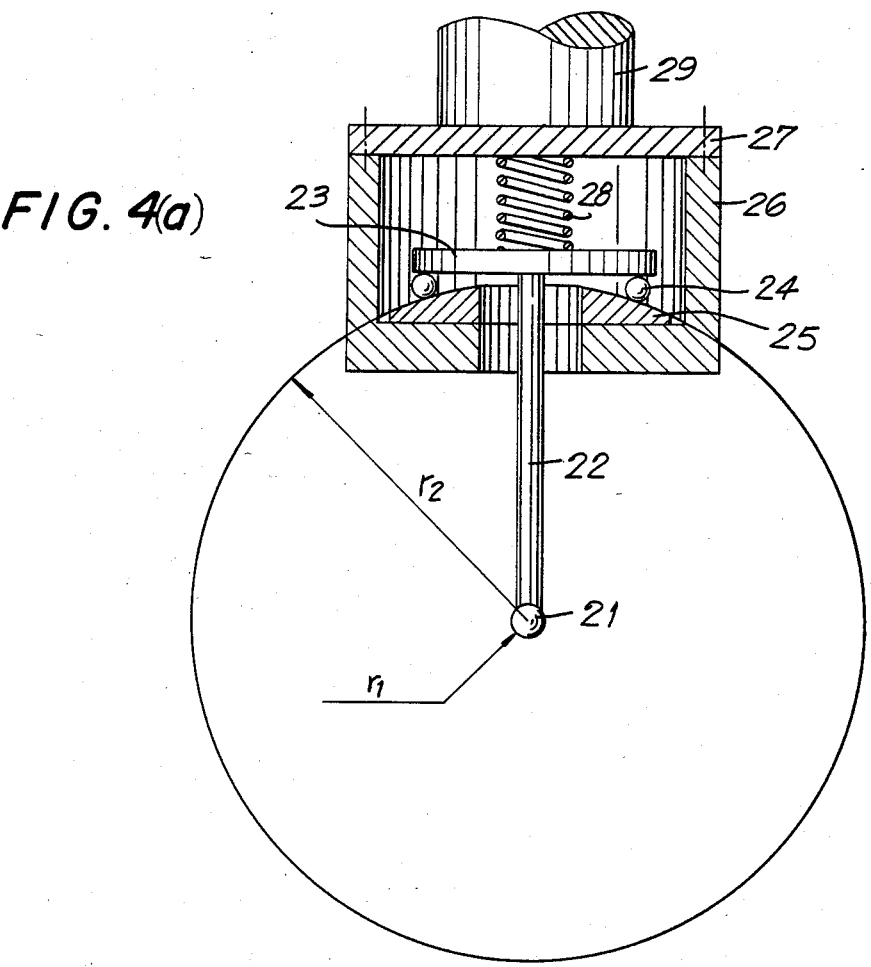
FIGS. 4(a) and 4(b) are a side elevation in cross section and a bottom plan view, respectively, of an embodiment of the present invention.
Figure 4B:
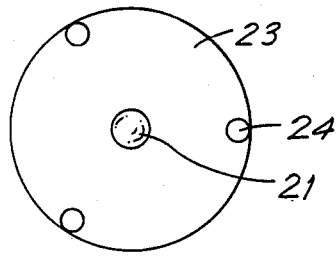

Referring now to FIGS. 4(a) and (b), in one aspect of the invention, contact electrode 21 is arranged at one end of stylus 22, and the other end of stylus 22 is secured to first support member 23 that is formed as a flat disc. Disc 23 is resting upon or abutting three equally spaced balls 24 that are in turn located upon second support member 25. The arrangement of the three balls 24 in relation to disc 23 is shown in FIG. 4(b), wherein it is seen that balls 24 are arranged on a bolt circle of diameter slightly less than the outer diameter of disc 23 and are evenly spaced therearound. Both support members 23 and 25, with balls 24 interposed therebetween, are arranged inside cylindrical housing 26 having cover member 27. First support member 23 is urged into contact with balls 24, and thus balls 24 are urged into contact with second support member 25, by means of spring 28 arranged between first support member 23 and the inside surface of cover member 27. The outer surface of second support member 25 has a spherical surface, which is part of an imaginary sphere that is concentric with the center of electrode contact 21. The radius of the imaginary sphere is shown at $r_2$ in FIG. 4(a).

In order to utilize the inventive device of FIGS. 4(a) and (b), shank 29, which is attached to housing cover 27, is fastened to the machine tool. This may be accomplished by inserting shank 29 into the chuck or other tool receiving device of the machine tool, and the arrangement of the inventive measuring device in the machine tool is represented in FIG. 5.

Figure 5:
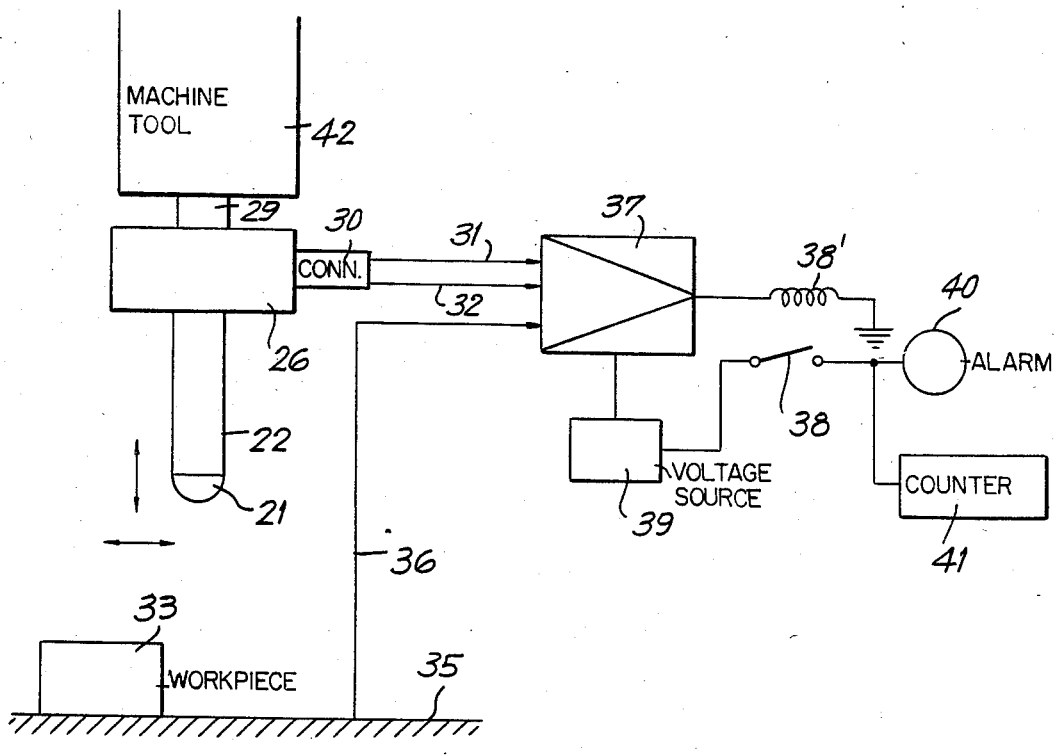
FIG. 5 is a schematic representation of an operational embodiment of the inventive device of FIG. 4.

FIG. 5 shows one aspect of the contact position detecting circuit for use with the present invention wherein housing 26, which carries stylus 22 with contact element 21, is attached to machine tool 42 by means of shank 29. Connector 30 connects two electrical conductors 31 and 32 to the input of amplifier 37. The connection of the other ends of wires 31 and 32 will be set forth in detail hereinbelow. The other input to amplifier 37 is electrical conductor 36, which is connected to table 35 upon which a suitable workpiece 33 is supported. The output of amplifier 37 is connected to excitation coil 38' of relay 38. Amplifier 37 is powered by voltage source 39 that is also is connected to power alarm device 40 and counter 41 through the relay contacts 38. Alarm device 40 may comprise a lamp, buzzer, bell or the like.

In operation of the arrangement of FIG. 5 then when there is mutual movement, as shown for example by the arrows in FIG. 5, between the worktable 35 and stylus 22, so that a face of workpiece 33 and electrode contact 21 approach and contact one another, an input circuit to amplifier 37 is completed. Upon completing an input circuit to amplifier 37 an output voltage is fed to excitation coil 38' that actuates relay 38 and energizes alarm device 40. Therefore, the location of the point of contact between contact electrode 21 and workpiece 33 that completed the input circuit to amplifier 39 is immediately and precisely detected. It must be noted that machine tool 42 is typically of the numerically controlled kind and, thus, a read out in one form or another is always provided as to the location of the operating head of the machine tool in relation to a reference on worktable 35. Thus, while alarm 40 provides some indication of the point of contact between electrode contact 21 and workpiece 33 a more realistic and useful output would be a digital retention in a memory or a punched paper tape of these specific coordinates of such contact. Exemplary of apparatus to produce such quantative recorded information is counter 41, which may be arranged to be reset to zero by actuation of switch contacts 38, thereby to start counting to place a numerical value on how far worktable 35 or stylus 22 has moved establishing contact.

Figure 6:
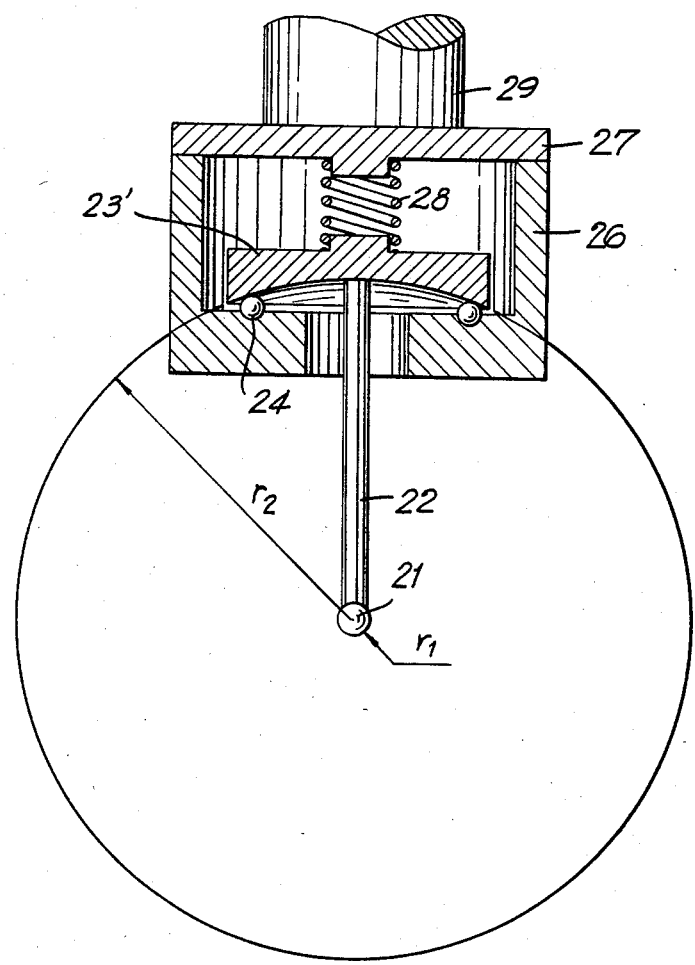
FIG. 6 is a side elevation in cross section of an embodiment of the present invention.

In FIG. 6, another embodiment of the present invention is shown wherein the basic configuration of the two support members is reversed, that is, disc 23' is configured having a spherical downwardly facing lower surface that is part of an imaginary sphere formed concentrically with the center of electrode contact 21 and, thus, would have a spherical surface of radius $r_2$. Similarly, and taking the place of disc 23 in the embodiment of FIG. 4a, the three balls 24 are received in the bottom of the housing 26, so as to contact the spherical surface of support element 23'.

As may be seen from the above discussion relative to these two embodiments of the invention, the inventive apparatus is not complex and employs a minimum of elements, whereby each supporting ball 24 within housing 26 is stable at any position on the concentric spherical surface formed in either the two supporting members, 23 or 25, without being limited to only one position, as was the case in the previously known structure described above. Thus, the present invention provides not only apparatus that reduces the effective number of parts or elements in the system but also provides a precise position detection irrespective of any slip that may occur between the balls and the spherical surface member due to friction therebetween, because any such slip will not affect the position of the electrode contact 21 in any way.

FIGS. 7(a) and (b) and FIG. 8 show another embodiment of the present invention wherein the first support member that was formed as disc 23 has been replaced by a toroidal shaped wheel having an outer edge or rim 24c which is circular and cross section and thus may be termed "donut shaped". In this embodiment additional control or support is provided to stylus 22 and electrode contact 21 by means of the circular cross section ring 24c contacting the outwardly facing spherical surface of second support element 25. Because circular cross section outer rim 24c is functionally the equivalent of balls 24 in the above-described embodiments, the reference character ascribed thereto will follow the same numerical notation.

Figure 9A:
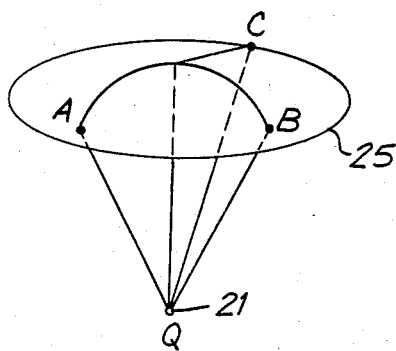
FIGS. 9(a) and 9(b) are graphical representations useful in explaining the theory of operation of the embodiment of FIG. 7(a)

As an example of the operation of the embodiment of FIG. 7, reference is had to the representation of FIGS. 9(a) and (b), wherein it is seen that if first support member 23 contacts the spherical surface of second support member 25 for position control of electrode contact 21 at points A, B, and C, then these three points define a sphere of radius R from the center Q of electrode contact 21. Since the center of electrode contact 21 and the center of the spherical contact surface of second support member 25 coincide, as described above, then, for any point P located on the spherical surface within points A, B, and C, PQ equals R. Therefore even if positions A, B, or C, or P deviate from the positions as shown, the position of center Q never changes. If an error $\Delta R$ is generated to reposition point P, by $\Delta d$, center Q is moved to Q'. In this case, the error E, which is the distance between Q and Q' is expressed by:

$$E = \Delta d \Delta R / R$$

Therefore, if an error $\Delta d$, exists for the setting position of the support member that supports the electrode contact 21, the error of the position of the electrode contact 21 is reduced to $\Delta R/R$.

This may be seen in the embodiment of FIGS. 7(a) and (b), the circular cross-sectional 24c of first support member 23 is coaxial with stylus 22 and is urged into line contact with the concentric spherical surface of second support member 25, as represented by circle L in FIG. 7(b). Further, the outer extreme surface of circular edge 24(c) is in static contact with the inner surface of the wall of housing 26. Therefore, the positional deviation $\Delta d$ becomes substantially zero when electrode contact 21 and stylus 22 remain stationary and, accordingly, the error becomes extremely small. Additionally, the inventive device as discussed in relation to the above embodiment is extremely smooth in operation, when any three-dimensional forces are applied to electrode contact 21.

In construction in the embodiment of FIG. 7(a) and (b), the circular outer edge 24(c) of first contact element 23 may be formed of insulating material, or may be coated with insulating material, so that an appropriate electrical circuit will be completed at the moment of contact of electrode contact 21 with a workpiece 33 to be measured, in order to accomplish the position detection.

Figure 10:
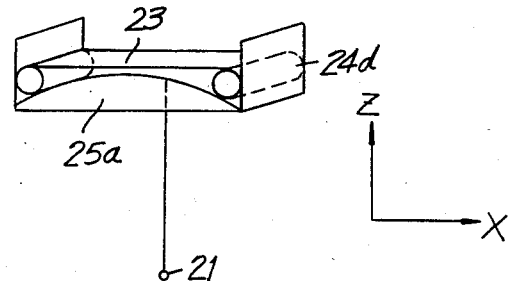
FIG. 10 is a schematic representation of a measuring element useful in an embodiment of the present invention.
Figure 9B:
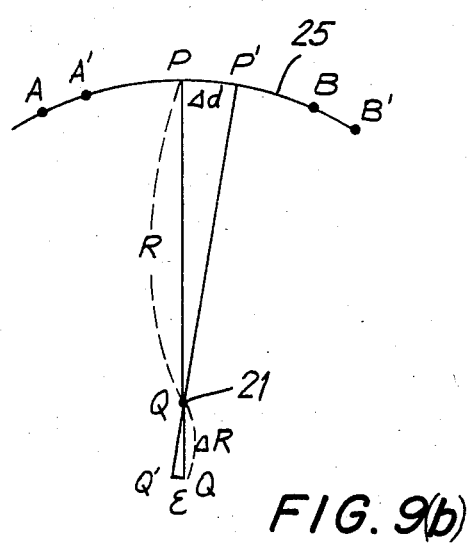
Figure 11:
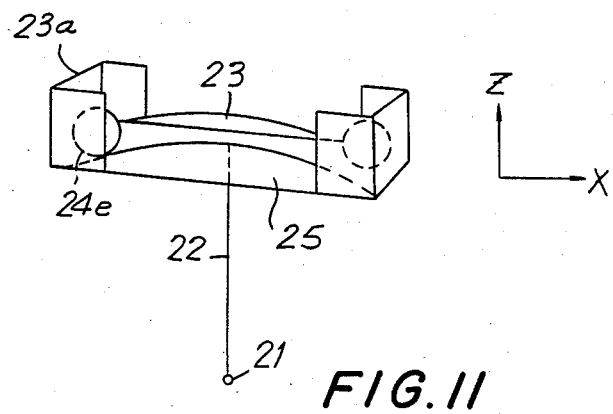
FIG. 11 is a schematic representation of a measuring element useful in an embodiment of the present invention.

Although stylus 22 with electrode contact 21 is intended to be operative in all three dimensions according to the above embodiments, it is also possible by following the present invention to make the stylus 22 operative in only two dimensions. This can be accomplished by limiting motion in one of the three dimensions, which in this example may be thought of as the Y-axis direction. Reference is now had to FIGS. 10 and 11, wherein the structure forming the second support member is formed as a part of a cylindrical surface, instead of being a part of a spherical surface such. As shown in FIG. 10, in place of spherical surface 25 of the preceding embodiments, the second support member 25 is formed with a cylindrical surface and the portions of the first support member that contact the second support member 25a are formed as tubular contact elements 24d, of circular cross section in place of the ring shaped outer rim 24c of the preceding embodiment. Note again that this embodiment is intended for operation in two dimensions only, in the X-axis and the Z-axis directions, and, thus, tubes 24d provide a linear bearing surface against cylindrical surface 25a.

In the embodiment of FIG. 11, again only two degrees of freedom are provided by use of box-like retainer elements 23a that act to prevent two spheres 24e forming the contact part of first contact member 23 from rotating about the axis of stylus 22, that supports electrode contact 21. In the embodiment of FIG. 11, the spheres 24e could be replaced by oblique cones, which would not be capable of rotating about the axis of stylus 22.

In keeping with the embodiments described above, it is noted that housing 26 need not be in a cylindrical form and all that is required is that it restore electrode contact 21 to its original position at all times when electrode contact 21 is not in contact with workpiece 33.

Based upon the above, it may be seen that regardless of the embodiment, in all cases the present invention keeps the amount of movement of the stylus constant.

The extent of motion is held constant regardless of the horizontal direction in which the stylus operates, because the two support members of the electrode are in line contact with each other and, thus, provide a larger contact area. This line contact resulting in the larger contact area also provides good recovery, high accuracy, and excellent durability of the working interfaces. Furthermore, the relatively simplified construction facilitates the manufacturing process and thereby provides benefits associated therewith.

Referring now to FIGS. 12(a) and (b) and 13, another embodiment of the invention is shown, wherein metallic, electrically conductive contact surfaces are formed on first support member 23. Specifically, first contact member 23 is formed in the donut or toroidal shape, similar to the embodiment of FIG. 7a, and electrically conductive contact surfaces at 29a, 29b, 29c are affixed thereto. Contact surfaces 29a, 29b, 29c are pie shaped and are substantially equal in size and in angular arc subtended. Contact surfaces 29a 29b, 29c extend outwardly over the circular cross-sectional outer rim portion 24c of this embodiment and each metallic, electrically conductive plate 29a, 29b, and 29c is provided with a terminal 29a', 29b' and 29c', respectively, to which conductors are attached for connection to a logic circuit. The conductive segments 29a, 29b, 29c may be mechanically attached to first contact element 23 by means of screw terminals 29a', 29b', 29c', respectively. Second support element 25 is also formed of electrically conductive material.

Figure 16:
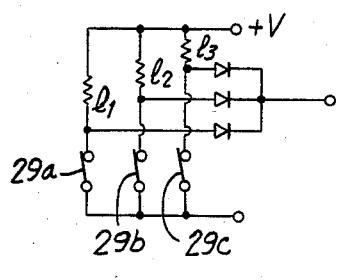
FIG. 16 is an electrical equivalent circuit diagram of the embodiment of FIG. 12.

Leads $l_1$, $l_2$, and $l_3$ that are connected to terminals 29a', 29b' and 29c', respectively, may each be fed through an isolation diode and then electrically connected to form a single output line having the function of a logical OR gate, as represented in the schematic of FIG. 16. As seen in FIG. 16, when all segments 29a, 29b, 29c are in contact with second support element 25 it is the equivalent of having three normally closed switches and, thus, providing no voltage drop across the switches and no voltage at the output of the circuit. When one or more of the switches in FIG., 16 opens, a voltage determined by the supply v and the resistor value will be fed through an isolation diode and will appear at the output of the circuit, thereby providing an OR gate function.

In the embodiment of FIGS. 12(a) and (b) and 13, the circular cross-sectional outer rim 24c is formed of electrically non-conductive, or insulating material so that at the moment that electrode contact 21 touches a workpiece (not shown), may be either conductive or non-conductive, one or more of the metallic plates 29a, 29b, and 29c, which are all normally in contact with electrically conductive second support member 25, will be separated therefrom due to mechanical displacement of stylus 22 and the electrical connections according to FIG. 16 will produce a signal thereby achieving position detection. Thus, it is not necessary that the workpiece 33 be electrically conductive in order to accomplish position detection, as described above in relation to the embodiment of FIG. 4.

Figure 14:
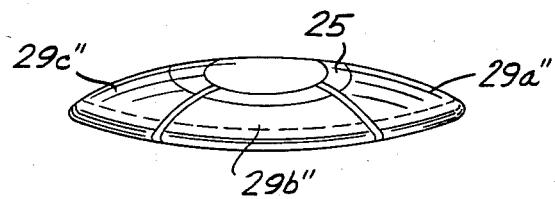
FIG. 14 is a perspective view of a portion of a position measuring device according to an embodiment of the present invention.

In the embodiment of FIGS. 12(a) and (b) and 13, the placement of the conductive material 29a, 29b, and 29c can be reversed so that circular cross section rim 24c of first support element 23 is formed of an electrically conductive material and second support member 25 is made of insulative or electrically non-conductive material is provided with three electrically conductive elements, formed as three segments 29a", 29", 29c" shown in FIG. 14 and electrically connected as in FIG. 16.

Figure 15:
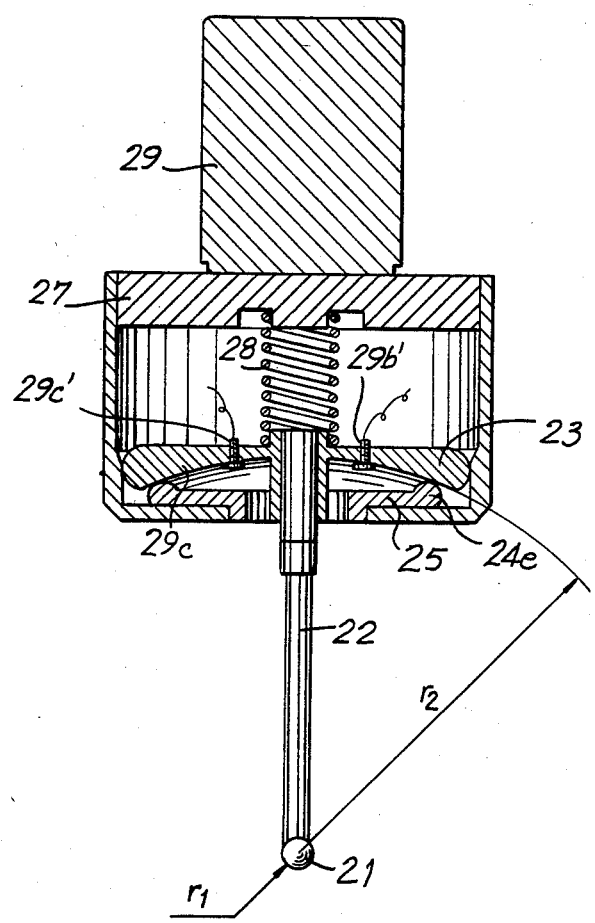
FIG. 15 is a side elevational view in cross section of an embodiment of the present invention.
Figure 17:
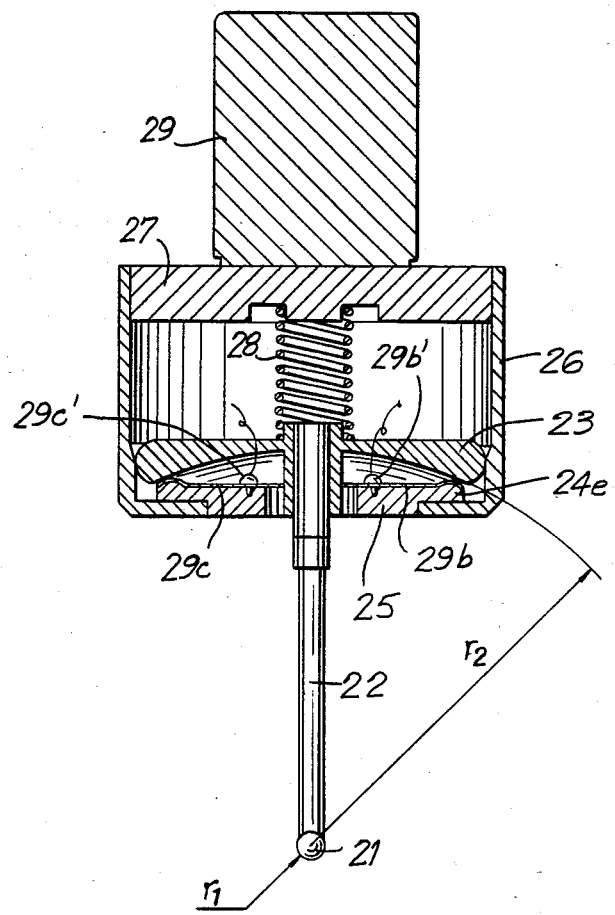
FIG. 17 is a side elevational view in cross section of embodiment of the present invention.

In the embodiment of FIGS. 15 and 17, the base of first support member 23 is configured as an inwardly or downwardly facing spherical surface defined by an imaginary sphere concentric with the center of contact electrode 21, and second support member 25 is formed substantially as a disc provided with a circular cross sectional rim element, similar to the rim of the embodiment of FIGS. 7(a) and (b). In the embodiments of FIGS. 15 and 17, the metallic contact surface can be placed either on the inner spherical surface of first contact member 23 or on the circular cross-sectional rim second support member 25. For example, in the embodiment of FIG. 15, conductive layer 29c, similar to that as described in relation to the embodiment of FIG. 12, can be arranged on the inwardly spherical surface of support element 23 and provided with electrical contacts 29a', 29b' and 29c'. Second support element 25 is formed of electrically conductive material or at the least circular cross-sectional rim element 24e is formed of or coated with electrically conductive material.

Alternatively, the electrically conductive layer can be placed on second support element 25, at 29b and 29c in FIG. 17.

In the embodiment of FIG. 17 the position detecting switch (not shown) composed of the electrode contact 21, as seen in FIG. 4, may also be used in addition to the switch provided by the conducting layers as shown in FIGS. 12(a) and (b), 15, and 17, to provide a redundant position detecting capability. This will require the additional conductor, either 31 or 32, of FIG. 5.

Figure 19:
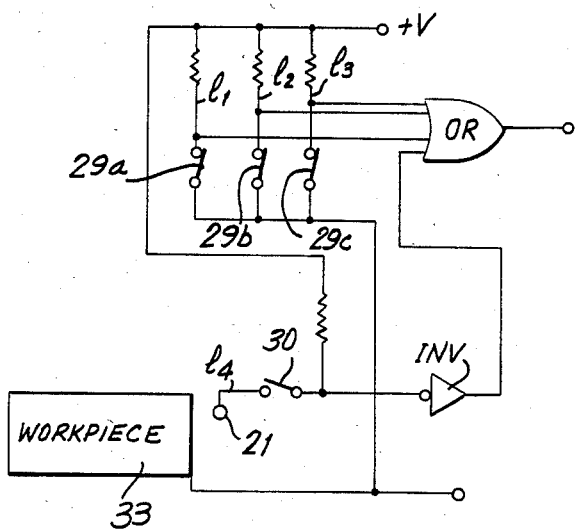
FIG. 19 is a circuit for use in the detecting device of the embodiment of in FIG. 18.
Figure 18:
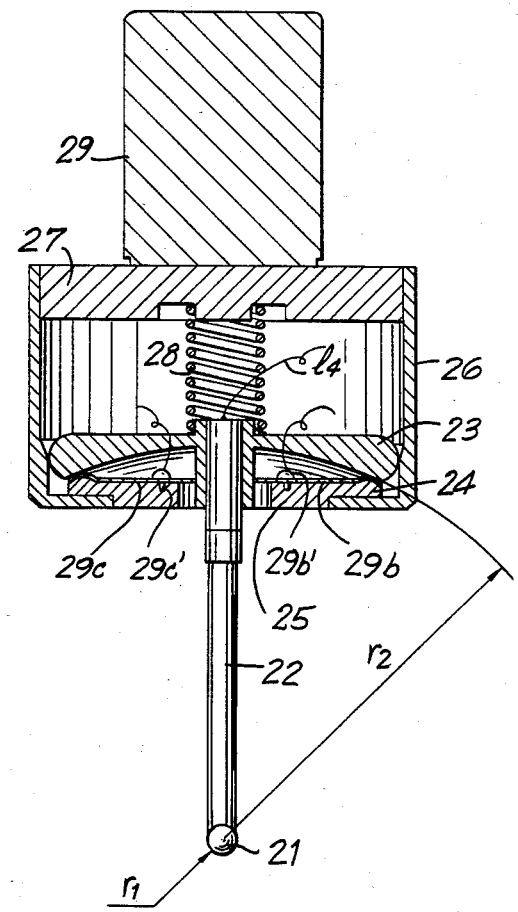
FIG. 18 is a side elevational view in cross section of a support mechanism for use in an embodiment of the present invention.

FIGS. 18 and 19 show such an embodiment, wherein additional leads are provided specifically, additional lead wire $l_4$ from electrode contact 21 and stylus 22 is connected to an OR circuit through an inverter circuit along with the leads from the switches, $L_1$, $L_2$, and $L_3$. The inverter is used because the sense of this mode is the opposite of the internal switching mode, in that way the logical OR function is correct for both position detecting modes. An additional switch is provided in lead line 4 to eliminate this additional exterior position detecting switch if desired.

Figure 20:
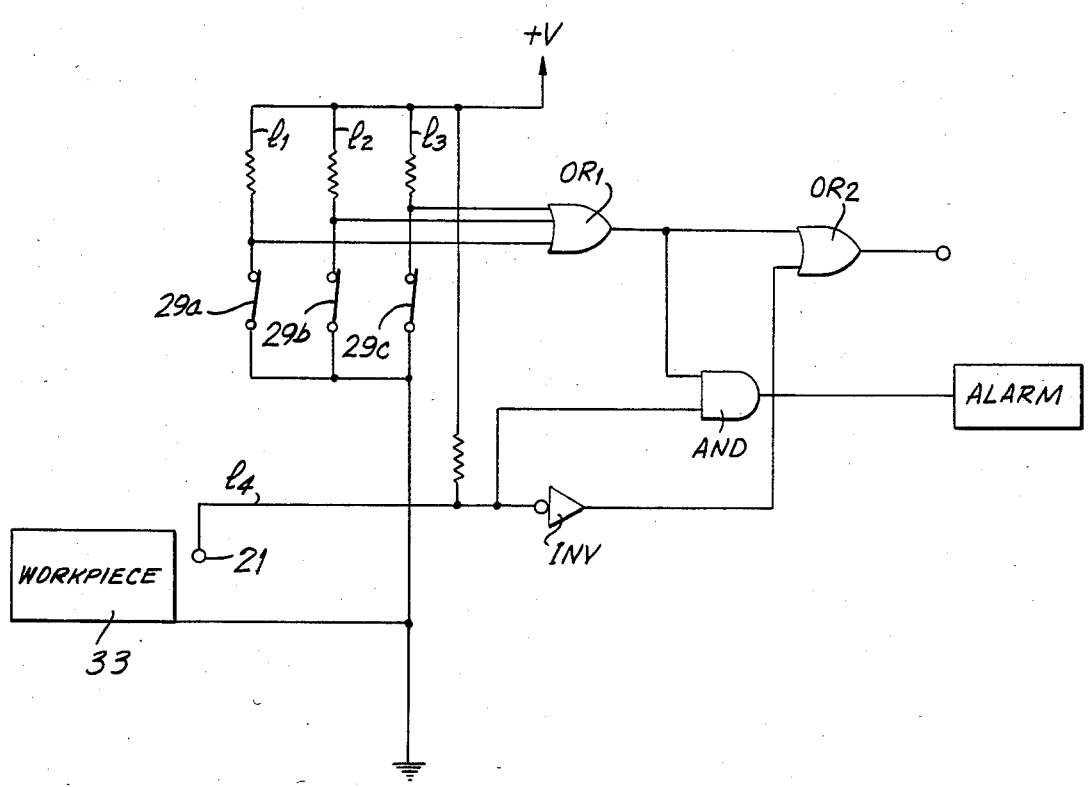
FIG. 20 is a circuit diagram of the measuring system of the embodiment FIG. 18.

In FIG. 20 an additional AND circuit is provided having the output of the OR gate connected as an input thereto, as well as line $l_4$ before it is inverted by the inverter circuit. The output of this AND gate is connected drive an alarm circuit, so that it is possible to detect any abnormal condition in the interior switches, as when these two switches do not agree.

As described above in detail, the embodiments of the present invention keep the amount of movement of the stylus constant, regardless of the horizontal direction in which the stylus is moved, because the support members of the electrode contact are in line contact one with another, and thus, the contact area is much larger than that simply provided by three individual mounting points, as in prior art devices. In addition to good recovery, high accuracy, durability, and ease of manufacturing, since the first and second support members within the housing include switches in themselves it is possible to make positional measurements on workpieces which are electrically non-conducting.

Figure 21A:
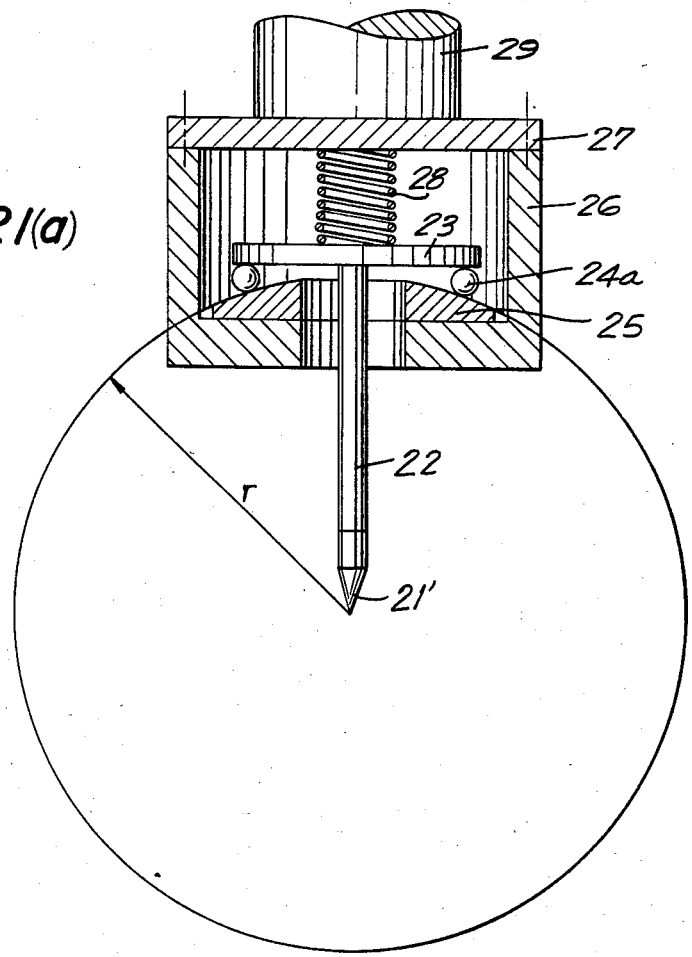
FIGS. 21(a), (b), and (c), are a cross-sectional side elevation, a bottom plan view, and a schematic operational representation, respectively, of an embodiment of the present invention.
Figure 21B:
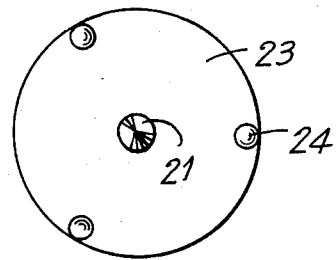
Figure 21C:
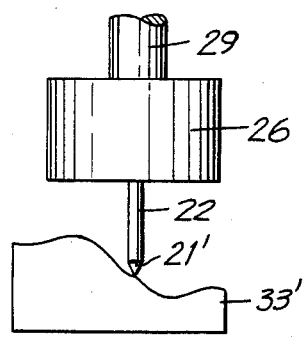

Referring now to FIGS. 21(a), 21(b), and 21(c), an embodiment of the present invention is shown wherein the stylus 22 is provided with a pointed or needle tip 21' to act as the electrode contact in place of the conductive sphere of the previously described embodiment. In this arrangement, the stylus 22 and electrode contact 21 touch workpiece 33' having irregular surfaces at a point nearer to the axis of the stylus 22, as shown in FIG. 21c and thus, permits decreasing any measurement error. To further alleviate any such error drive from the construction of the position detecting device described above, it is preferable to locate the end point P of the needle tip 21' of 22 at the center of the curved spherical surface of support member 25, so as not to cause positional deviation of stylus tip 21', even when contact positions between balls 24 and second support member 25 change.

Figure 22A:
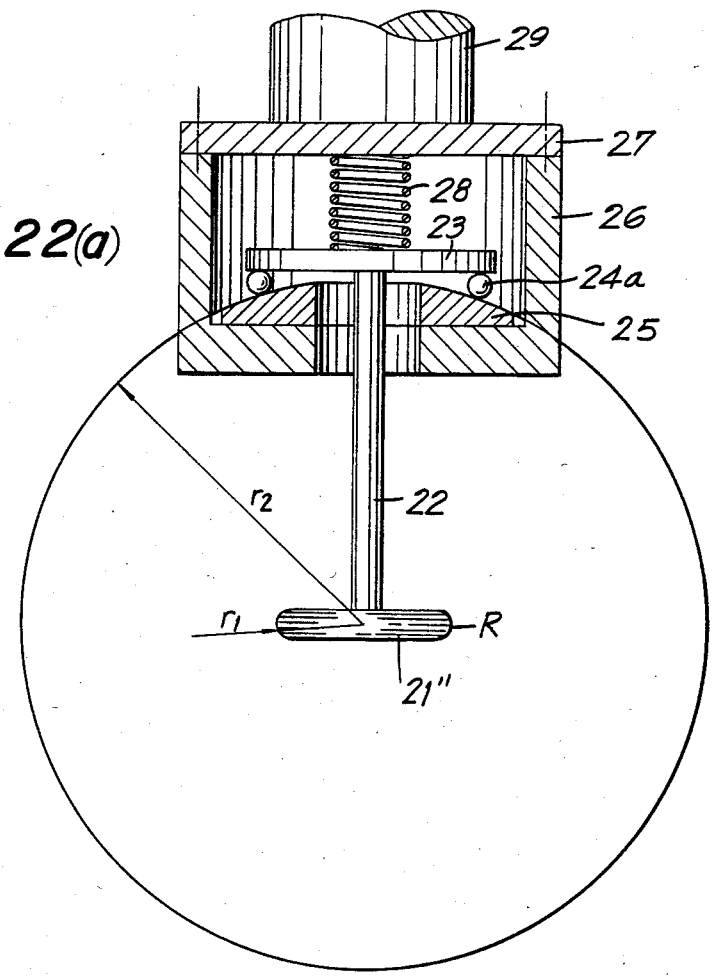
FIGS. 22(a), (b) and 22(c), are a side elevation in cross section, a bottom plan view, and a schematic representation of an operational system, respectively, of an embodiment of the present invention.
Figure 22B:
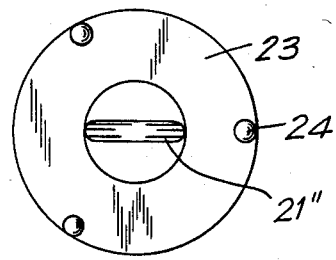
Figure 22C:
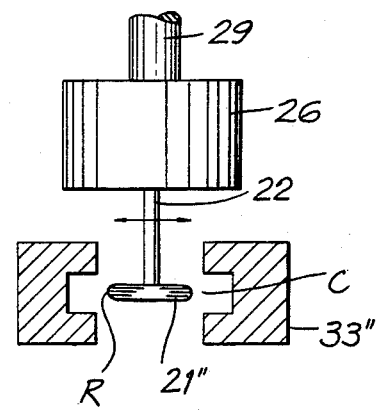

FIGS. 22(a), 22(b), and 22(c) show an embodiment of the present invention, in which stylus 22 is provided at the end thereof with a disc 21" having an outwardly spherical edge R in place of the conductive sphere. In using this arrangement, when workpiece 33 has a groove C formed therein, it is possible to measure the depth of the groove by horizontally moving the position detecting device in such a manner that the edge R of disc 21" contacts the inner surface of groove C. The diameter of disc 21" may be selected as desired according to the depths and steps on the inner wall of grooves to be measured. Once again, in this embodiment the spherical surface of disc 21" and second support member 25 are concentric, so that the measurement point of the disc 21" remains unchanged even when the contact points between balls 24 and second support member 25 change, as in the embodiment of FIG. 4. This embodiment also contemplates that the tip 21" of stylus 22 is replaceable to add either a disc having a spherical edge surface or the needle point as described above. In this fashion, by replacing the operable end of the stylus, the kinds of workpieces that may be measured are increased and also the potential for measurement error is decreased by tailoring the stylus to the objects to be measured.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention, as defined in the appended claims.

What is claimed is:

1. An apparatus for use with an electrical circuit for detecting a location of a surface of a solid object, comprising:
   a housing;
   a stylus having an electrically conductive electrode contact at one end thereof for contacting a surface of said object;
   stylus support means for supporting said stylus to permit freedom of movement in at least two dimensions, being arranged within said housing and formed of at least two support members, one of said two support members having a spherical surface concentric with the center of said electrode contact and being biased into contact with the other of said two support members for mutual movement therebetween, said electrical circuit being responsive to said electrode contact's touching said surface of said solid object.

2. An apparatus for detecting the location of a surface according to claim 1, in which the other of said two support members (the one not having a spherical surface) includes a plurality of rotatable ball elements biased into contact with said spherical surface.

3. An apparatus for detecting the location of a surface according to claim 1, in which said two support members are biased into mutual contact one with another by a spring means arranged within said housing.

4. An apparatus for detecting the location of a surface according to claim 1, in which said electrode contact is formed as an electrically conductive sphere.

5. An apparatus for detecting the location of a surface according to claim 1, in which the other of said two support members is formed having an annular rim of substantially circular cross-section, said annular rim being biased into contact with said spherical surface.

6. An apparatus for detecting the location of a surface according to claim 1, in which the other of said two support members is configured as a longitudinal portion of a cylinder, the straight longitudinal edges thereof having a substantially circular cross-section and being biased into contact with said spherical surface.

7. An apparatus for detecting the location of a surface according to claim 1, including conductor means whereby said electrode contact is electrically connected to said electrical circuit and wherein said solid object is electrically conductive, whereby upon said electrode contact's touching said solid object a circuit is completed and a detection is indicated.

8. An apparatus for detecting the location of a surface according to claim 1, in which mutually contacting surfaces of said two support members are electrically conductive and are in electrical contact with each other, said conductive surfaces of said two support members being electrically connected to said electrical circuit, whereby when said contact electrode of said stylus touches said surface of said solid object said electrical conducting surfaces of said two support members are moved out of electrical contact to affect a response by said electrical circuit.

9. An apparatus for detecting the location of a surface according to claim 8, including a logical OR gate having an input connected to one of said two support members and another input connected to an electrical conductor connected to said contact electrode.

10. An apparatus for detecting the location of a surface according to claim 9, in which the surface of one of said two support members is formed as a plurality of electrically conductive segments, electrically isolated one from another, each of said segments being connected to a separate input of said logical OR gate.

11. An apparatus for detecting the location of a surface according to claim 10, in which electrical conductors from said segments are connected to said OR gate and said electrical conductor from said contact electrode of said stylus is connected through an inverter means to a second logical OR gate having input thereto an output of the first logical OR gate, said output of said first logical OR gate and input of said inverter circuit being connected as inputs to a logical AND gate, an output of said logical AND gate being connected to an alarm circuit means.

12. An apparatus for detecting the location of a surface according to claim 1, in which said electrode contact is configured as a pointed tip.

13. An apparatus for detecting the location of a surface according to claim 1, in which said electrode contact is configured as a disk arranged substantially perpendicularly to the longitudinal axis of said stylus.

14. An apparatus for detecting the location of a surface according to claim 13, in which the periphery of said disk has a substantially spherical surface.

15. An apparatus for use with an electrical detecting circuit for detecting the position of a surface of a solid object, comprising:
 a housing;
 stylus means having an electrode contact at one end thereof for contacting a surface of said solid object;
 stylus support means arranged within said housing for movably supporting said stylus means to have freedom of movement in at least two dimensions and including two stylus support elements biased into contact one with another, one of said two stylus support elements having a contact surface formed as a portion of a sphere having a center at the center of said electrode contact; and
 electrical conductor means whereby said electrical detecting circuit is responsive to said electrode contact's touching a surface of said solid object.

16. An apparatus for detecting the position of a surface according to claim 15, in which the other of said two support members (the one not having a spherical surface) includes a plurality of rotatable ball elements biased into contact with said spherical surface.

17. An apparatus for detecting the position of a surface according to claim 15, in which said two support members are biased into mutual contact one with another by a spring arranged within said housing.

18. An apparatus for detecting the position of a surface according to claim 15, in which said electrode contact is formed as an electrically conductive ball.

19. An apparatus for detecting the position of a surface according to claim 15, in which said stylus support means is formed so that the extent of contact between said two stylus support elements is a line.

20. An apparatus for detecting the position of a surface according to claim 15, in which said other of said two support members (the one not having a spherical surface) is formed having an annular rim of substantially circular cross-section, said other of said support members being biased so that said annular rim is in contact with said spherical surface.

21. An apparatus for detecting the location of a surface according to claim 15, in which the other of said support members (the one not having a spherical surface) is configured as a longitudinal portion of a cylinder, straight edges of said longitudinal portion of a cylinder having a substantially circular cross-section and being biased into contact with said spherical surface.

22. An apparatus for detecting the position of a surface according to claim 15, in which said electrode contact is electrically connected to said detecting circuit and said solid object is electrically conductive, whereby upon said electrode contact's touching said solid object said detecting circuit is actuated and a detection is indicated.

23. An apparatus for detecting the position of a surface according to claim 15, in which the surfaces of said two support members are electrically conductive and are in electrical contact with each other and said two stylus support members are electrically connected to said detecting circuit, whereby when said contact electrode of said stylus touches said surface of said object said electrically conductive surfaces of said two stylus support members are moved out of contact to affect said detecting circuit.

24. An apparatus for detecting the position of a surface according to claim 23, including a logical OR circuit having an input connected to one of said two stylus support members and another input connected to said electrical conductor means connected to said contact electrode.

25. An apparatus for detecting the position of a surface according to claim 24, in which the surface of one of said two support members is formed as a plurality of electrically conductive segments, electrically isolated from each other, each segment being connected to a separate input of said logical OR circuit.

26. An apparatus for detecting the position of a surface according to claim 25, in which electrical conductors from each of said segments are connected to said logical OR circuit, said electrical conductor from said electrode contact is connected through a logical inverter means to a second OR circuit having input thereto an output of the first logical OR circuit, said output of the first logical OR circuit and said input to said logical inverter means being connected to a logical AND circuit, the output of said logical AND circuit being connected to an alarm means.

27. An apparatus for detecting the position of a surface according to claim 15, in which said electrode contact is configured as a pointed tip.

28. An apparatus for detecting the position of a surface according to claim 15, in which said electrode contact is configured as a disk arranged substantially perpendicular to the longitudinal axis of said stylus.

29. An apparatus for detecting the position of a surface according to claim 28, in which the periphery of said disk is formed as having a spherical surface.

30. An apparatus for use with a machine having an element that is movable in relation to a fixed reference surface and the extent of movement thereof being measureable for detecting the location of a surface of a solid object relative to said fixed reference surface, comprising:
 a stylus having a metal contact at one end thereof for making physical contact with a surface of said solid object and including an electrical conductor connected to said metal contact;
 stylus support means attached to said movable machine element and including at least two support members resiliently held in mutual contact one with another, one of said support members including means whereby the area of contact between said two support members can be described by a line, and one of said two support members having a spherical contact surface concentric with the center of said metal contact; and
 a detecting circuit connected to said metal contact for detecting when said metal contact touches said surface of said solid object.

31. An apparatus for detecting the location of a surface according to claim 30, in which the one of said two support members not having a spherical surface includes a plurality of rotatable ball elements biased into contact with said spherical surface.

32. An apparatus for detecting the location of a surface according to claim 30, in which said two support members are biased into mutual contact, one with another, by a spring.

33. An apparatus for detecting the location of a surface according to claim 30, in which said metal contact is formed as an electrically conductive sphere.

34. An apparatus for detecting the location of a surface according to claim 30, in which said one of said two support members not having a spherical surface is formed having an annular rim with a substantially circular cross-section, said annular rim being biased into contact with said spherical surface.

35. An apparatus for detecting the location of a surface according to claim 30, in which the one of said support members not formed having a spherical surface is formed as a portion of a cylinder, said portion of a cylinder having the straight edges thereof formed having a substantially circular cross-section biased into contact with said spherical surface.

36. An apparatus for detecting the location of a surface according to claim 30, in which the surfaces of said two support members are electrically conductive and are in electrical contact with each other, said two support members being electrically connected to said detecting circuit, whereby when said metal contact of said stylus touches said surface of said object, said electrically conductive surfaces of said two support members are moved out of electrical contact to affect said detecting circuit.

37. An apparatus for detecting the location of a surface according to claim 36, in which said detection circuit includes an OR circuit having an input connected to one of said two support members and another input connected to said electrical conductor connected to said metal contact.

38. An apparatus for detecting the location of a surface according to claim 37, in which the surface of one of said two support members is formed as a plurality of electrically conductive segments, each segment electrically isolated from another, wherein each segment is connected to a separate input of said OR circuit.

39. An apparatus for detecting the location of a surface according to claim 38, in which electrical conductors from said individual conductive segments of said support member are connected to inputs of said OR circuit, said conductor from said metal contact being connected through an inverter circuit to a second OR circuit, the output of the first OR circuit being fed to said second OR input, said output of the first OR circuit and the input to said inverter circuit being connected to an AND circuit, the output of said AND circuit being connected to an alarm means.

40. An apparatus for detecting the location of a surface according to claim 30, in which said metal contact is configured having a disk arranged substantially perpendicularly to the longitudinal axis of said stylus, the periphery of said disk having a substantially spherical surface.

* * * * *